United States Patent [19]

Payne

[11] 4,100,666
[45] Jul. 18, 1978

[54] ASSEMBLY METHOD
[75] Inventor: William J. Payne, Greensburg, Pa.
[73] Assignee: Modulus Corporation, Chagrin Falls, Ohio
[21] Appl. No.: 792,933
[22] Filed: May 2, 1977
[51] Int. Cl.$^2$ ............................................ B23Q 17/00
[52] U.S. Cl. ........................................ 29/407; 29/705; 29/720
[58] Field of Search .................... 29/407, 705, 720; 73/1 B

[56] References Cited

U.S. PATENT DOCUMENTS

| | | | |
|---|---|---|---|
| 3,248,923 | 5/1966 | Blakely | 73/1 B |
| 3,370,336 | 2/1968 | Otto | 29/407 X |
| 3,602,976 | 9/1971 | Grube | 29/407 |
| 3,851,386 | 12/1974 | Ellzey, Jr. | 29/407 |
| 3,960,810 | 7/1976 | Pagano | 29/407 |

Primary Examiner—Leon Gilden
Attorney, Agent, or Firm—Fay & Sharpe

[57] ABSTRACT

An assembly apparatus and method for use in the manufacture of strain indicators of the type in which a window and an indicator area are provided in a fluid filled capsule. Movement of the indicator area with respect to the window gives a visual indication of the load condition of the indicator. The assembly apparatus comprises means to provide for the initial placement of the fluid filled capsule into the tensile member of the strain indicator. Thereafter a compressive force is exerted on the capsule in order to bring the indicator area of the capsule in close proximity to the window with the tensile element in a relaxed condition. Following initial assembly the apparatus of this invention exerts a tensile pull on the tensile member of the strain indicator which causes the indicator area of the capsule to be separated from the window. Gap measuring means are employed to measure the distance between the window and the indicator area with the tensile element in a state of tension. Subsequently, adjustment means are utilized to adjust the gap to a predetermined value at load. The capsule is then fixed to the tensile member and the strain indicator is ready for use.

9 Claims, 12 Drawing Figures

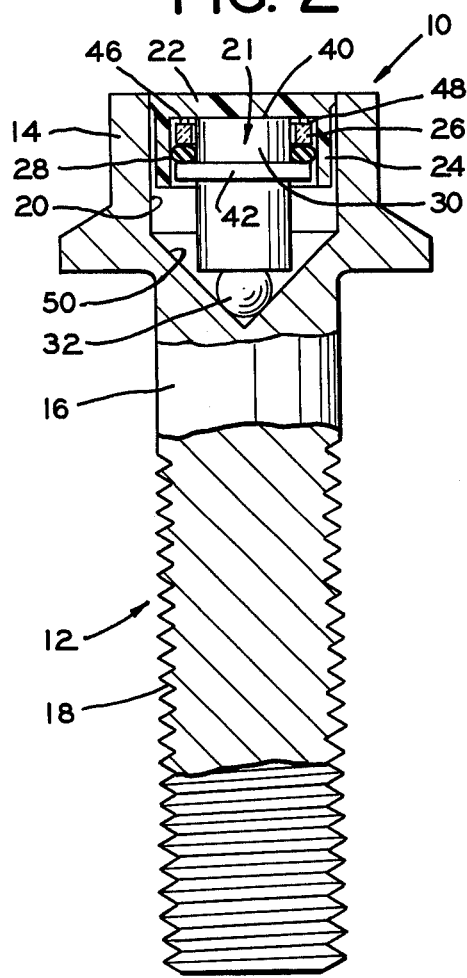
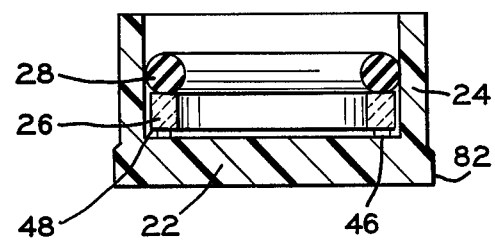
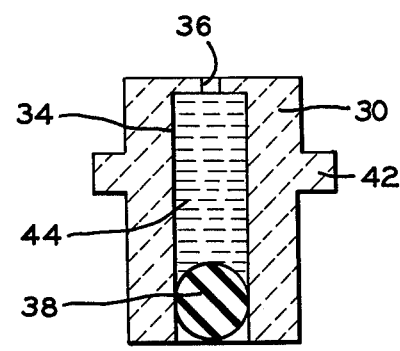
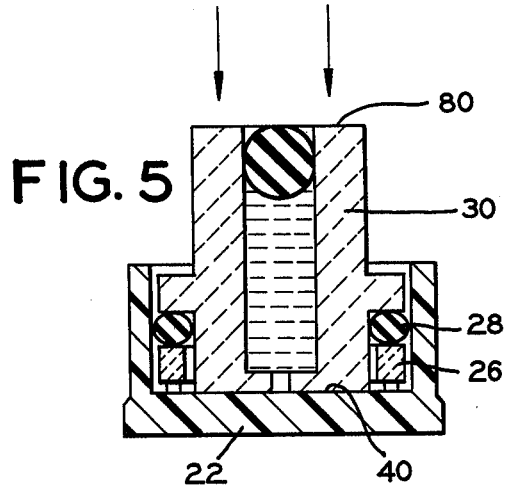
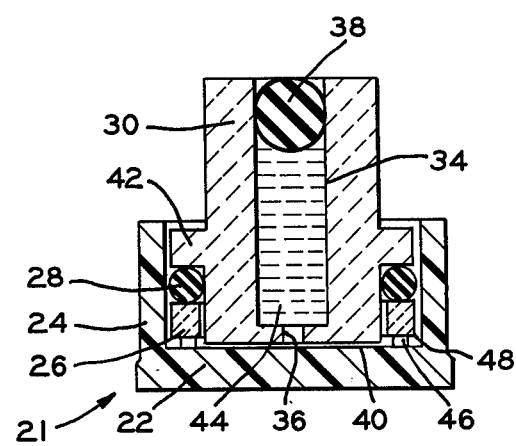

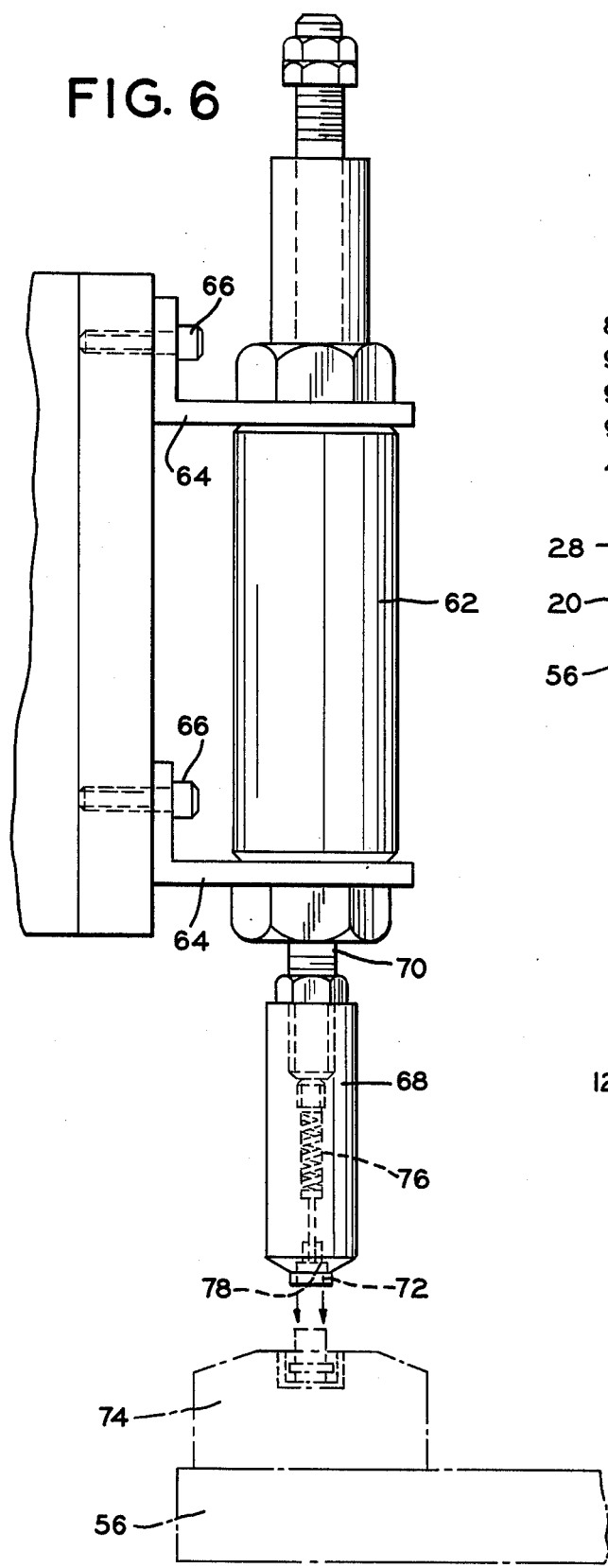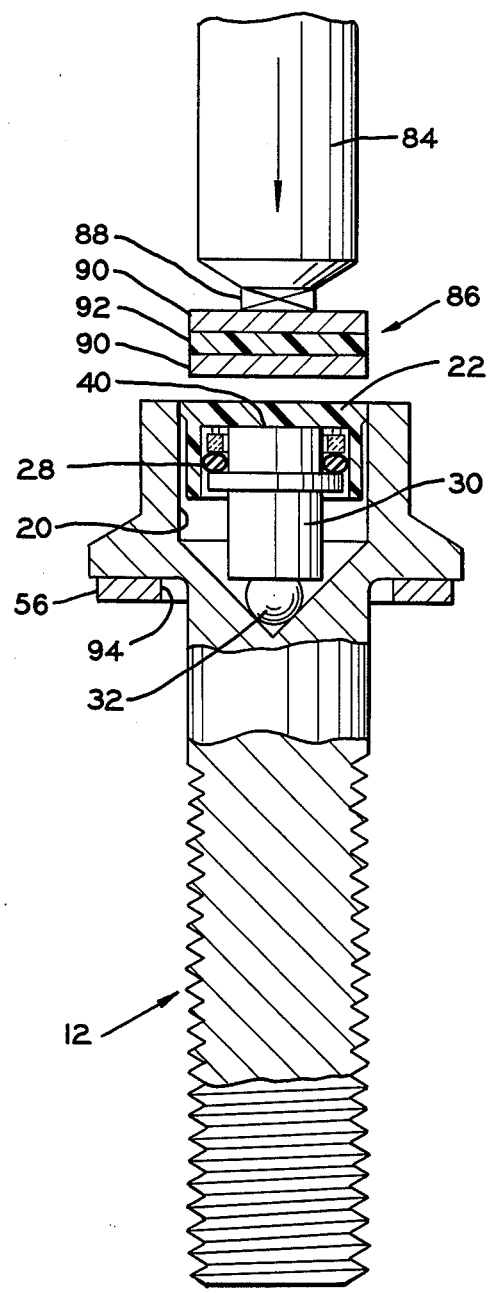

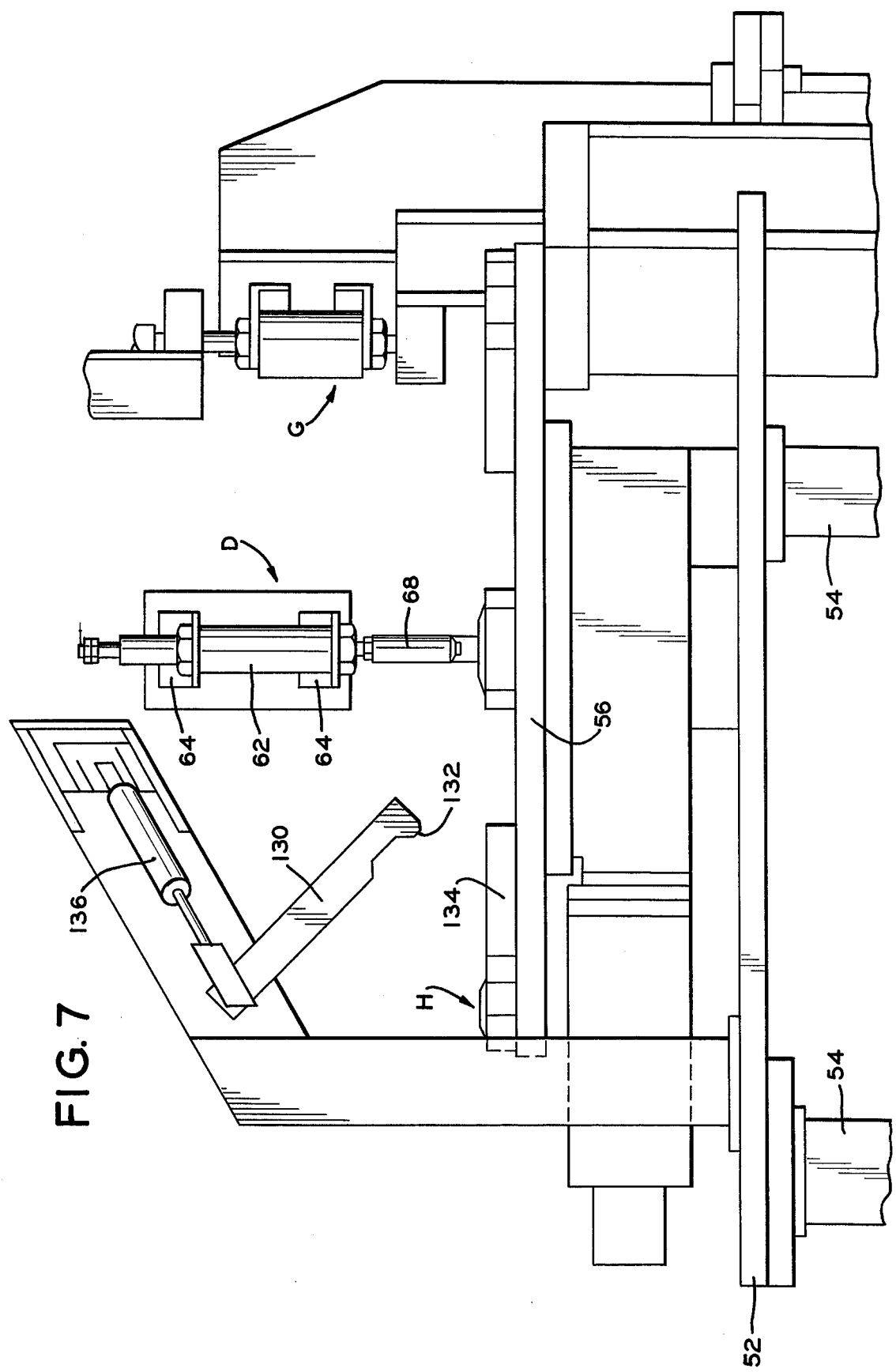

ASSEMBLY METHOD

CROSS REFERENCE TO RELATED APPLICATIONS AND PATENTS

U.S. Pat. No. 3,602,186 discloses a fluid type strain indicator. U.S. Pat. Nos. 3,799,108, 3,850,133, 3,964,299 and 4,002,139 all disclose fluid type indicators incorporating a capsule. U.S. patent application Ser. No. 595,786 filed July 14, 1975 discloses further embodiments of capsule type fluid indicators. U.S. patent application Ser. No. 609,374 filed Sept. 2, 1975 discloses a combination torque and temperature indicator incorporating a fluid filled capsule. Modulus Corporation, the assignee of this application, is the owner of all of the patents and patent applications just referenced with the exception of U.S. Pat. No. 3,602,186. Modulus Corporation is a licensee with respect to the claimed subject matter of U.S. Pat. No. 3,602,186.

BACKGROUND OF THE INVENTION

This invention is directed to assembly apparatus and methods of assembly of strain indicators, fluid type and non-fluid type. The preferred embodiment of this invention is directed to the assembly of fluid strain indicators of the general type disclosed in the patents and applications referenced above under the heading "Cross Reference to Related Applications and Patents". It should be appreciated, however, that the apparatus and methods of this invention are not solely limited to the structures shown and described in the patents and applications referenced herein. Rather, the referenced applications and patents are cited merely for the purpose of illustration to demonstrate the application of the assembly apparatus and methods of this invention. The invention is also applicable to the assembly of non-fluid type strain indicators as will be described below.

Fluid filled strain indicators of the type shown in the applications and patents referenced above operate on a principle that the application of stress to a strain or tensile member causes an elongation or deflection to take place in the tensile member. If a fluid filled capsule including a window and an indicator area is advantageously positioned relative to the tensile member, the change in length or deflection encountered in the tensile member after a load has been placed on such member can be translated into movement of the indicator area with respect to the window. As a result the change in length of the tensile member or deflection thereof can be visually observed thus giving confirmation as to the load condition of the tensile member.

Total movement of the indicator area with respect to the window of strain indicators of the type referenced above is very slight being on the order of 0.001 inches. That is to say as the tensile member is placed under load movement of the indicator area with respect to the window from a no load to a design load condition is on the order of magnitude of 0.001 inches. It can therefore be appreciated that the tolerances required in the manufacture and assembly of strain indicators of this type are quite close. Dimensional inaccuracies of the smallest degree can either produce an erroneous or false reading as to the load condition of the tensile member or no reading at all.

This invention is directed to assembly apparatus and assembly methods by means of which strain indicators may be assembled on a production line basis and wherein individual testing and evaluation of each indicator is accomplished as assembly takes place.

This invention further provides for assembly apparatus and methods by means of which dimensional variations and inaccuracies in the individual components of the indicator can be effectively compensated for in assembly.

SUMMARY OF THE INVENTION

Briefly summarized applicant's assembly apparatus comprises a plurality of assembly stations by means of which a fluid filled capsule is manufactured as a subassembly and later joined to a tensile member. Applicant's apparatus then provides for an initial assembly of the capsule to the tensile member such that the indicator area of the capsule is positioned closely adjacent the window in order to provide a reference point for the no load condition of the tensile member. Thereafter a tensile pull is exerted on the tensile member by the apparatus of this invention in order to place the tensile member in a design load condition. As the tensile pull is exerted on the tensile member the indicator area of the capsule becomes separated from the window as a small gap is created between these members. The magnitude of the gap is related to the degree of load placed on the tensile member. With the tensile member under load applicant's apparatus provides for the optical measurement of the magnitude of the gap created between the indicator area and the window. As a result of this measurement a determination is made as to whether the visual presentation made by the indicator (with the tensile member under load) is within precalculated conditions. If the visual presentation at design load is outside of pre-established conditions an adjustment is made to the capsule structure such that the gap between the indicator area and the window (at the particular load) is within desired limits. This is accomplished by either moving the window toward the indicator area or, alternately, moving the window away from the indicator area. Once acceptable performance conditions have been met in the indicator, the capsule is then caused to be fixed to the tensile member and the indicator is then ready for use.

This invention also includes the method steps described broadly above in connection with the assembly of fluid type strain indicators.

BRIEF DESCRIPTION OF THE DRAWING

Applicant's assembly apparatus and methods will now be described with reference to the accompanying drawings in which:

FIG. 2 is a side elevational view, partly in section, and showing a fluid filled strain indicator of the type that may be assembled using the apparatus and methods of this invention;

FIG. 3A is a side elevational cross-sectional view showing a capsule subassembly including the lens, reference ring and O-ring;

FIG. 3B is a side elevational cross-sectional view showing a capsule subassembly including the indicator element, sealing ball and fluid;

FIG. 4 is a side elevational cross-sectional view showing the subassemblies of FIGS. 3A and 3B together prior to compression;

FIG. 5 is a side elevational cross-sectional view of the capsule assembly of FIG. 4 after compression;

FIG. 6 is a side schematic view of the compression station D of the assembly apparatus of this invention;

FIG. 7 is a side schematic view of the assembly apparatus of this invention and showing stations D, G, and H;

FIG. 8 is a side elevational view, partly in section, and partly in schematic form, and showing the operation of station F of the assembly apparatus of this invention;

DESCRIPTION OF FLUID TYPE INDICATOR

Figure 1:
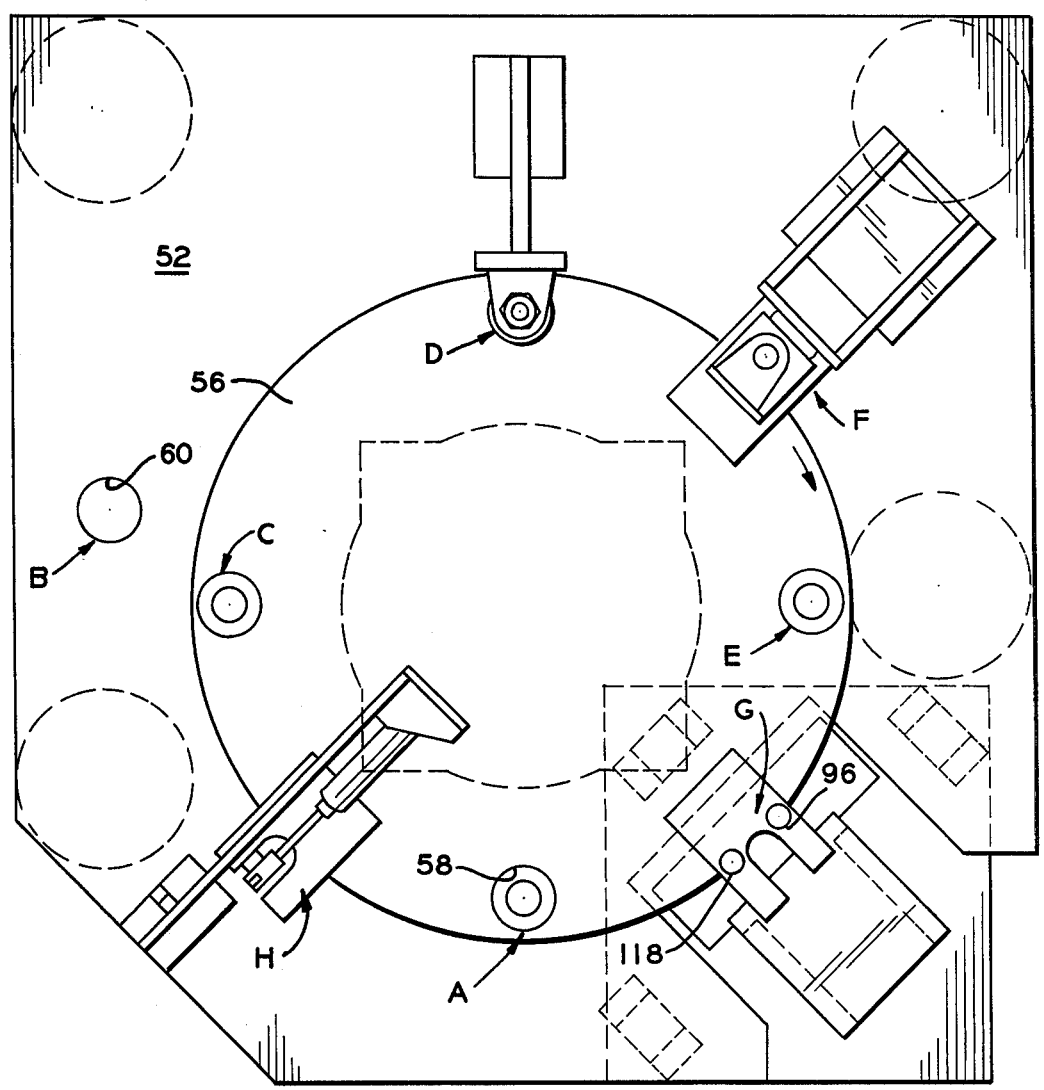
FIG. 1 is an overhead schematic view of the assembly apparatus of this invention showing the various stations thereof.

Before proceeding with a description of the preferred embodiment of the assembly apparatus and methods of this invention reference will first be made to FIG. 2 wherein there is shown a fluid type indicator as installed in a fastener. The particular indicator as shown in FIG. 2 is the subject of applicant's co-pending application Ser. No. 595,786 filed July 14, 1975. A brief description of the indicator of FIG. 2 will be made in this application in order to gain an appreciation for applicant's assembly apparatus and methods. It should be understood, however, that applicant's assembly apparatus and methods are applicable to many different types of indicators (both fluid and non-fluid types) not necessarily the type shown in FIG. 2 of this application. The strain indicator of FIG. 2 is illustrative of but one type of fluid indicator that may be assembled using the assembly apparatus and methods of this invention.

The fluid indicator of FIG. 2 is shown broadly as indicator 10 displayed in relation to a fastener 12 which includes a head 14, a shank 16 and external threads 18. A recess 20 is defined within head 14 for the purpose of receiving the capsule 21.

With particular reference to both FIGS. 2 and 4 it will be seen that capsule 21 is a fluid holding member which includes a U-shaped or cup shaped lens or window 22 having a generally cylindrical skirt section 24. A generally annular reference ring 26 is disposed within window 22 along with a bias and seal element 28. An indicator member 30 is also disposed within the window in the manner shown in FIGS. 2 and 4 with a portion thereof extending into the cup shaped window 22 and another portion thereof extending outside of the window so that when assembled as shown in FIG. 2 it is in contact with pivot ball 32.

The indicator member 30 of FIGS. 2 and 4 is a one-piece element which defines an internal cavity 34 and an opening 36. A sealing ball 38 is adapted to be received within the cavity 34 in order to seal one end thereof in the manner shown in FIG. 4.

An indicator area 40 is defined at the planar end surface of indicator member 30. As shown in FIG. 2 indicator area 40 is disposed generally parallel to the internal surface of the window 22 and, as will be described more fully below, is adapted to move into and out of close proximity with the internal surface of window 22.

As will be apparent from FIGS. 2 and 4 indicator member 30 is generally cylindrical in shape and includes an external flange 42. Flange 42 is adapted to be sealingly engaged by the bias and seal element 28 in order to retain fluid 44 within the internal cavity of the fluid holding member 21. In the embodiment of FIG. 2 seal element 28 is defined by an O-ring.

Reference ring 26 is disposed between O-ring 28 and window 22. Ring 26 is generally annular in shape and includes a plurality of circumferentially spaced projections 46 at the surface 48 thereof in order to permit the flow of fluid around the reference ring 26 and through the relatively small space defined between the reference ring 26 and the window 22. It should be appreciated that the projections 46 are interrupted circumferentially about the surface 48 of reference ring 26 in order to permit the flow of fluid across the reference ring 26.

The projections 46 are dimensionally equal to the displacement of the indicator area 40 at design load. That is to say the longitudinal dimension of projections 46 (as viewed in FIG. 2) is equal to the displacement of the indicator area 40 as the fastener is taken up to design load.

Reference ring 26 is of the same material and color as indicator member 30. In the embodiment of FIGS. 2 and 4 surface 48 of ring 26 is of the same color as indicator area 40 for a purpose to be described more fully below.

Skirt section 24 of window 22 is sealingly engaged by O-ring 28. Thus the elements 22, 24, 28, and 30 together define an internal space into which light absorbing indicator fluid 44 is retained in a sealed condition.

Opening 36 of indicator member 30 permits the flow of fluid into and out of the internal cavity 34 and into and out of the space defined by the members 22, 24, 28 and 30.

In the embodiment of FIGS. 2 and 4 the window or lens 22 is fabricated from a clear plastic such as Lexan. Alternate materials such as glass may be used. Reference ring 26 and indicator member 30 are fabricated from glass. It should be appreciated, however, to those skilled in the art that other materials including plastics or metal may be used if they match thermal expansion rates of the fastener and do not exhibit creep displacement with time. These features are important as a result of small displacement values involved. In addition, the materials must be color stable within the environment of use.

Sealing and bias element 28 and sealing ball 38 of the embodiment of FIGS. 2 and 4 are fabricated from any suitable elastomeric materials.

OPERATION OF THE INDICATOR OF FIG. 2

In the non-stressed condition of the fastener as shown in FIG. 2 the indicator area 40 of the indicator member 30 is in contact with the internal surface of window 22. Since indicator area 40 is brightly colored the non-stressed condition of the fastener is characterized by the appearance of a brightly colored inner annulus (defined by indicator area 40) which is clearly visible through the lens 22 and an outer annulus defined by surface 48 of reference ring 26. The outer annulus of color defined by reference ring 26 will be masked somewhat by the dark blue fluid 44 in the space defined by projections 46. The colors of the area 40 and surface 48 will thus not appear to be the same when viewed through the lens with the fastener in a non-stressed condition.

When the fastener is taken up and placed in a stressed condition there is achieved not only elongation of the shank of the fastener but also deflection of the fastener head. Take-up thus causes the wall 50 of the recess 20 of the fastener to have a vertical component of displacement in a downward direction as observed in FIG. 2. Since bias and seal element 28 is in a state of compression following assembly as shown in FIG. 2 any downward movement of internal surface 50 will product the result that pivot ball 32 and indicator member 30 will follow such movement. Once take-up has been completed a gap or space will be defined between the window 22 and the indicator area 40. This space will be filled with the dark light absorbing indicator fluid 44 which will tend to mask or cover the brightly colored indicator area 40 thus presenting an optical appearance showing that take-up has been accomplished.

A color reference is employed in order to serve as a guide to the installer of the fastener thus to indicate when sufficient torque has been applied to the fastener during take-up. In the embodiment of FIG. 2 the fixed color reference is defined at surface 48 of the reference ring 26. The projections 46 have a depth which is equal to the designed displacement of the surface 40 at load. Thus when take-up is complete the gap between the surface 40 and the window is equal in depth to the space defined by the projections 46. Thus at load the color exhibited by the area 40 is the same in appearance as the color exhibited by the surface 48. The installer thus torques the fastener until the colors exhibited by the area 40 and surface 48 are uniform.

After take-up the gap or space defined between the indicator area 40 of the fastener and the window will remain so long as the fastener continues to be under stress. Should the fastener become loosened the indicator area will return to a position in substantial contact or engagement with the internal surface of the window.

For a more complete description of the operation of the strain indicator of FIG. 2 reference is made to applicant's co-pending application Ser. No. 595,786 filed July 14, 1975 which is incorporated herein by reference.

ASSEMBLY APPARATUS DESCRIBED

Reference will now be made to FIG. 1 wherein there is shown in schematic form applicant's assembly apparatus including a number of stations which have been identified as stations A-H.

The apparatus of FIG. 1 includes a fixed plate or base 52 which is adapted to be supported by a plurality of legs 54 (FIG. 7). Mounted centrally of fixed plate 52 is a rotating plate 56 which is designed to move the workpiece from one station to another. The control means and related apparatus necessary to support and rotate the plate 56 have been omitted in the interest of clarity. It should be understood, however, that plate 56 is adapted to rotate in a clockwise direction as viewed in FIG. 1 in a sequence of steps starting with station A and ending with the discharge station H.

Turning once again to FIG. 1 the rotating plate 56 is provided with a generally circular recess 58 which defines station A. The function of station A is to permit the manual assembly of the window 22, reference ring 26 and seal 28 in the manner shown in FIG. 3A. It should be appreciated that the installer positioned at station A provides for the completion of the subassembly of FIG. 3A by manually positioning the window 22 in the recess 58 of plate 56 such that the skirt section 24 is pointed upwardly. Thereafter the reference ring 26 and seal 28 are positioned as shown in FIG. 3A.

The subassembly of FIG. 3A is then indexed from station A to the position of station C as shown in FIG. 1. Prior to indexing, however, the subassembly of FIG. 3B is produced at station B. At station B there is provided a recess 60 in plate 52 which is adapted to receive the indicator member 30 in order to provide for the fluid fill of the indicator member and the placement of the sealing ball 38.

The completion of the subassembly of FIG. 3B may be accomplished in several ways. First, the sealing ball 38 may be positioned in place as shown in FIG. 3B and thereafter the internal cavity 34 may be filled with fluid 44 through the use of a fluid injection needle inserted through the opening 36 from a suitable source of fluid supply. Alternately the subassembly of FIG. 3B may be completed by placing the sealing ball 38 at the bottom of the recess 60 and thereafter partially filling the recess with fluid. Placement of the indicator member in the fluid will then cause the internal cavity 34 to become filled. Thereafter the sealing ball 38 may be brought into place by pressing the indicator member onto the sealing ball in the fluid reservoir of the recess 60.

Once filled as shown in FIG. 3B the subassembly of station B is then joined to the subassembly of station A at station C. This is accomplished by manually inserting the fluid filled indicator member subassembly of FIG. 3B into the window subassembly of FIG. 3A in the manner shown in FIG. 4.

It should be understood that the subassembly of FIG. 3B is joined to the subassembly of FIG. 3A at station C without appreciable compressive force applied to these members. That is to say the seal element 28 of FIG. 4 is not appreciably compacted after completion of the subassembly as the indicator member 30 (including fluid 44 and sealing ball 38) is generally loosely received within the window subassembly. There is thus a slight gap or clearance defined between the indicator area 40 of FIG. 4 and the internal surface of the lens or window 22.

From station C the capsule of FIG. 4 is indexed in a clockwise direction on plate 56 to station D. The basic function and purpose of station D is to achieve compression of the capsule subassembly. Referring to FIGS. 1, 6 and 7 it will be seen that the station D compression apparatus consists of a pneumatic cylinder 62 fixed to the machine base by means of brackets 64 and fasteners 66. A contact head 68 is affixed to actuator rod 70 which extends from the pneumatic cylinder 62. A recess 72 is provided at the outer end of contact head 68 in order to receive the upper cylindrical portion of the indicator member 30 of the subassembly of FIG. 4. It should be appreciated that the subassembly of FIG. 4 is positioned in a recess provided in holding block 74 in the manner shown in phantom in FIG. 6. Upon application of pneumatic pressure to cylinder 62 actuator rod 70 is forced in a downward direction to bring the contact head 68 into engagement with the indicator member 30 of the subassembly of FIG. 4. Continued application of a compressive force in the arrow direction shown in FIG. 6 causes the indicator area 40 of the subassembly to be brought into contact with the internal surface of the window or lens 22. This compressive force is also shown schematically in FIG. 5. It should be appreciated that in the application of a compressive force at station D air and excess fluid is forced from the capsule subassembly to a substantial degree. As the indicator area 40 of the member 30 is brought into contact with the lens or window 22 the bias and seal element 28 is compressed in the manner shown in FIG. 5.

In the preferred embodiment the compression station D is provided with a spring 76 which is positioned within the contact head 68 and cooperates with the contact head and actuator rod 70 to provide for alignment of the contact surface 78 relative to the surface 80 (FIG. 5) of the indicator member 30. Thus the surfaces 78, 80 are substantially parallel and, as a result, the compressive force imparted to the subassembly of FIG. 5 is essentially in an axial direction providing for the application of a uniform downward force.

After application of a suitable compressive force the contact head 68 is withdrawn upwardly as shown in FIG. 6 and, subsequently, plate 56 is indexed to station E (FIG. 1). It should be understood, however, that at station E the capsule subassembly is essentially in the condition shown in FIG. 5. That is to say the indicator area 40 is in substantial abutting contact with the internal surface of the lens or window 22 with substantially all air and excess fluid removed from the capsule. Surface tension effects will cause the indicator area 40 of the indicator member 30 to remain in contact with the window 22 in the position shown in FIG. 5 as the capsule is indexed to station E.

At station E the capsule subassembly of FIG. 5 is removed from the holding block 74 (FIG. 6) and is manually inserted into a drilled bolt or tensile member. It should be understood that at station E drilled bolts of the type shown in FIG. 2 (including recess 20 and converging internal side walls 50) are provided. In assembly the operator first inserts the pivot ball 32 in place. Thereafter the capsule subassembly of FIG. 5 is pressed into recess 20 a distance sufficient to provide for initial assembly of these members. The fastener embodiment of FIG. 2 described in connection with the preferred embodiment of the assembly apparatus of this invention provides for a press fit engagement of the capsule subassembly within the walls 20 defining the fastener recess. It should be understood that a plurality of circumferentially spaced serrations 82 (FIG. 3A) are provided on the external surface of the lens 22 for the purpose of engaging the side walls defining recess 20 of the fastener.

In the preferred embodiment of applicant's assembly apparatus the drilled fastener is inverted at station E with the capsule subassembly and pivot ball 32 being pushed up into the recess of the inverted bolt into approximately the position shown in FIG. 2. It should be understood, however, that final positioning of the capsule subassembly relative to the fastener or tensile member is accomplished at later stations of applicant's assembly apparatus to be described below.

From station E the assembled capsule and tensile member are manually transferred to station F.

Station F provides for a compressive force to be exerted on the capsule subassembly in order to drive the capsule subassembly into the recess 20 of the tensile element. To that end station F includes a suitable pneumatic cylinder and actuator rod (not shown) along with a drive head 84 (FIG. 8) and contact pad 86. The contact pad 86 is connected to drive head 84 by means of a pivot joint 88 which is shown schematically in FIG. 8. Contact pad 86 consists of a pair of metallic contact members 90 separated by an elastomeric contact member 92.

A slot 94 is defined in the plate 56 at station F for the purpose of receiving the tensile element 12 in the manner shown in FIG. 8. Once positioned actuation of the pneumatic cylinder causes the contact pad 86 to be brought to bear against the lens 22 of the capsule subassembly causing the capsule subassembly to be pressed into the recess 20 in approximately a fully assembled position. The pivot joint 88 and resilient contact pad 86 permit the indicator area 40 to be maintained in close proximity to the internal surface of the lens 22 as any misalignment between these surfaces or, indeed, any of the other elements of the capsule subassembly or tensile member will be compensated for.

The degree of compression exerted by the contact pad 86 and drive head 84 on the capsule subassembly will depend upon design considerations and such factors as the nature of the interference fit of the lens 22 in recess 20 and other variables.

From station F the indicator is indexed to station G where two tests and, if necessary, an adjustment are made.

The first test accomplished at station G is a light sensor test of the no load condition of the indicator. As the indicator is indexed from station F to station G it is essentially in the condition shown in FIG. 8. That is to say the indicator area 40 of indicator member 30 is in substantial abutting contact with the internal surface of the lens 22. Also the bottom portion of the indicator member 30 is in contact with the pivot ball 32 and the bias and seal element 28 is in a state of compression. These conditions of the elements just mentioned represent the no load or at rest condition of the tensile element 12. In such a no load condition of the tensile element 12 the brightly colored surface of the indicator area 40 is visible through the transparent lens 22. In one embodiment of applicant's indicator the indicator member 30 and indicator area 40 are colored bright yellow so that there is presented a substantially circular yellow color through the lens 22 with the tensile member in a non-stressed condition. In the embodiment just described the fluid utilized by applicant is dark blue in color being defined essentially by mineral oil into which has been dissolved a blue dye powder. With the indicator of FIG. 8 in a properly assembled configuration the indicator area 40 will be in substantial abutting contact with the internal surface of lens 22 and the indicator area 40 will present a yellow appearance through the lens 22. With incorrect alignment of the indicator area 40 with respect to the lens 22 or with a gap or space defined between these surfaces (with the tensile element in a non-stressed condition) there will be displayed a green to blue color through the lens 22 as the blue fluid will interact with the yellow indicator area to produce different shades of blue and green depending upon the degree of misalignment or the extent of the space between the indicator area 40 and the lens 22. Any variation, therefore, between a bright yellow color of the indicator 40 (with the tensile element in a non-stressed condition) and the color actually observed at station G by means of an optical sensor will indicate that the visual display of the indicator with the tensile element at a non-stressed condition is not correct. Accordingly, the indicator should be rejected for quality control reasons.

There is, therefore, positioned at station G a first optical indicator designated schematically at 96 in FIG. 1 for the purpose of verifying the correct optical display of the indicator at the no load condition of the tensile element. For ease of description the optical indicator 96 has only been shown schematically in FIG. 1. The details of the optical indicator itself form no part of this invention. Such indicators are commercially available.

Following initial sensing of the indicator by optical sensor 96 (with the tensile member in a non-stressed condition) a tensile pull is then exerted on the tensile member for the purpose of obtaining a second optical reading of the indicator with the tensile member in a stressed or design load condition.

Figure 9:
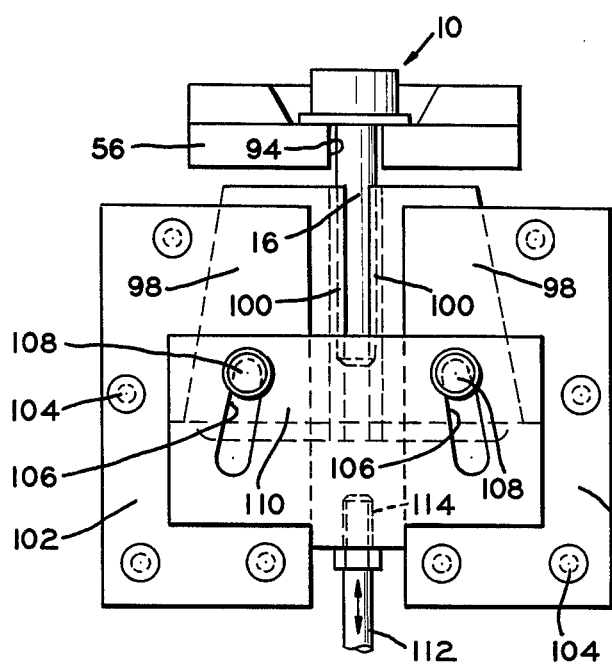
FIG. 9 is a side elevational view, partly in schematic form, and showing the operation of the tensile pull station G of the apparatus of this invention.

Applicant's tensile pull apparatus of station G is shown in FIG. 9. Indicator 10 is disposed in slot 94 of plate 56 such that a portion of the shank 16 extends below plate 56 in order to be gripped by a pair of jaws 98. Generally arcuate shank engaging jaw surfaces 100 are defined by each of the jaws 98 for the purpose of gripping the external surface of shank 16 of the indicator. Several embodiments of jaw surfaces may be used depending upon the configuration of the indicator shank. For example, if external threads are provided on the shank, corresponding thread segments may be defined on the jaw surfaces 100. Similarly, if the portion of shank 16 gripped by jaws 98 is unthreaded, gripping teeth or serrations may be provided on the jaw surfaces 100 in order to provide for a firm gripping attachment to the shank 16.

Jaws 98 are received within plates 102 which are secured to the machine base itself by means of fasteners 104. Slots 106 are defined in jaws 98 in order to cooperate with pins 108 which are carried by actuator 110. Actuator 110 is positioned exteriorly of plates 102 and is adapted to move in an up and down position (as viewed in FIG. 9) in the arrow direction shown by means of actuator rod 112 which is attached to actuator 110 at interengaging threads 114. Actuator rod 112 is, in turn, activated by means of a hydraulic cylinder (not shown) which receives hydraulic fluid under pressure from a suitable source (not shown). Upon pressurization of the cylinder actuator rod 112 moves in a downward direction (as viewed in FIG. 9) causing actuator 110 to move downwardly. In turn, pins 108 are brought to bear against the side walls defining slots 106 of jaws 98 causing the jaws to move radially inwardly into gripping engagement with shank 16 of indicator 10. A substantial tensile pull is then exerted on the indicator 10 which, in the preferred embodiment of applicant's apparatus, approximates the expected design load of the fastener. As shown in FIG. 9 indicator 10 is fully supported by plate 56 during the time that a tensile pull is exerted on shank 16. If necessary, one or more additional surfaces may be positioned below plate 56 in order to provide supplemental support for plate 56.

For ease of description the hydraulic mechanism providing for the downward movement (as viewed in FIG. 9) of actuator rod 112 has been omitted from this specification. It should be understood, however, that any convenient motivating force could be used within the spirit of this invention to provide for a downward movement of actuator rod 112 in order to provide for a tensile pull on the indicator 10.

Figure 11:
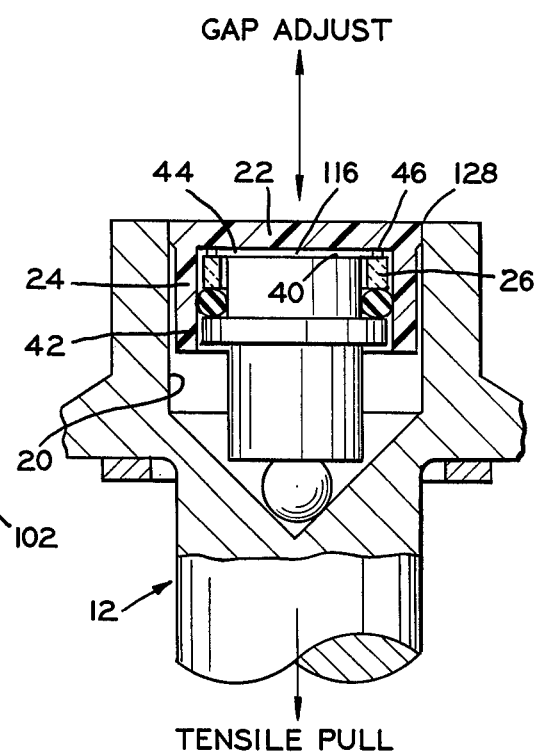
FIG. 11 is a side elevational view, partly in section, and partly in schematic form, showing the effect of gap adjustment on the capsule of the tension indicator as performed at station G.

In the preferred embodiment of the assembly apparatus of this invention the tensile pull imparted to the indicator at station G is approximately equal to the design load of the fastener in order to verify the proper functioning of the indicator under load. As has previously been noted, the application of a tensile pull to the indicator causes the indicator area 40 of indicator member 30 to move downwardly with respect to the interior surface of lens 22 thus creating a gap or space 116 (FIG. 11) between the lens and the indicator member. This gap is shown in the schematic representation of FIG. 11. As has previously been noted the occurrence of a gap or space between the indicator member 30 and the lens 22 causes light absorbing indicator fluid 44 to flow between these members as is shown in FIG. 11. Since fluid 44 is of a dark color (in the preferred embodiment fluid 44 is a dark blue) it tends to mask or obliterate the brightly colored indicator surface 40 which, in the preferred embodiment, is yellow. The degree of obliteration or masking of indicator area 40 by fluid 44 is somewhat proportional to the depth or dimension of gap 116. Using the colors described above (yellow indicator area and blue fluid) the appearance of the indicator will change from yellow (with the tensile member in a no load condition) to green (representing a mixing of yellow and blue) and finally to a deep blue or black if excess torque is applied. In the preferred embodiment applicant provides that the indicator show green at design load. As has been noted in connection with copending application Ser. No. 595,786 projections 46 of reference ring 26 provide a yardstick or measuring means against which the color of the indicator area 40 may be viewed during take-up. Projections 46 have a predetermined depth causing the yellow reference ring 26 to have a specific shade of green appearance through the lens 22. The depth of projections 46 is selected such that movement of indicator member 30 to the position shown in FIG. 8 produces the same apparent color of indicator area 40 through lens 22 as is produced by reference ring 26 through the lens. Reference ring 26 thus provides a convenient yardstick for the installer so that a predetermined design load is imparted to the tensile member of the indicator which is neither below the design load or in excess of the design load.

In order to verify the fact that indicator area 40 has moved a predetermined distance during take-up of the fastener (thus setting a predetermined gap 116) applicant provides a second optical sensor at station G which is in a position to detect the color visible through lens 22 at such time as the prescribed tensile pull has been exerted on the tensile member 12. The positioning of the second optical sensor is shown schematically at 118 in FIG. 1. Sensor 118 functions to determine whether the gap 116 introduced in the indicator during loading is within prescribed limits. This is accomplished by sensing the color of the indicator area 40 through the lens 22. If the color is too dark (green turning to deep blue or black) an indication is thus given that the gap is too large. Correspondingly, if the color is too light (tending toward yellow) this is an indication that the gap is too small. Additional means are provided at station G, to be described below, to adjust the gap with the fastener under load if it should be determined that it is not within prescribed limits.

Briefly summarizing, station G initially provides for an optical sensing or reading of the no load condition of the fastener as the fastener is moved from station F to station G under the optical sensor 96 (FIG. 1). In the no load condition of the fastener there should be presented a bright yellow color by the indicator area 40 through lens 22. Such a color indicates the proper placement of the indicator area 40 relative to the lens 22 under no load conditions. Assuming that the optical sensor 96 accepts the fastener as indicating a predetermined color in the no load condition, the fastener is then placed under a tensile load in order to provide for a second optical reading of the indicator at design load. Once under load the second optical sensor 118 (FIG. 1) makes a determination as to whether the indicator area 40 presents an optical appearance within predetermined limits. Presuming that the fastener successfully passes the inspection of the optical sensors 96 and 118 the load is then removed from the fastener and the indicator is further processed. If, however, the fastener does not pass one or both of the optical sensors 96, 118 it is either rejected entirely or a gap adjustment is made.

If the fastener does not pass the first optical sensor 96, i.e., the no load sensor, it is rejected. If, however, the fastener successfully passes optical sensor 96 but fails to come within acceptable limits at sensor 118 station G provides for a gap adjustment which will now be described.

As will be observed in the schematic representation of FIG. 11 it is possible to provide for an adjustment of gap 116 by moving lens or window 22 within recess 20 within the fastener head. To that end a compressive force may be exerted against the lens if it is desired to reduce the gap 116. Conversely, a tensile force or lifting force may be applied to the lens if it is desired to increase the depth of the gap 116.

Figure 10:
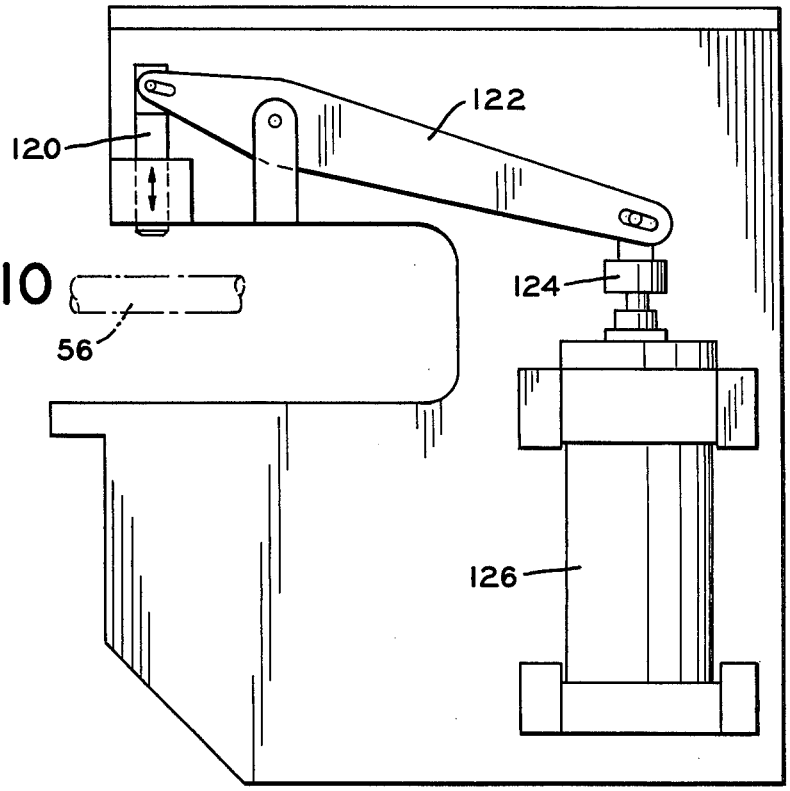
FIG. 10 is a side elevational view, partly in schematic form, and showing the gap adjustment mechanism of station G of the assembly apparatus of this invention.

Applicant's apparatus for applying a compressive force to the lens or window 22 at station G is shown in FIG. 10. For ease of description the rotating plate 56 is shown schematically in FIG. 10 and the tensile pull apparatus positioned below plate 56 has been omitted. Plunger 120 is adapted to move in an up and down direction as shown by the arrow in FIG. 10. The upper end of the plunger is engaged by rocker arm 122 which is activated by actuator rod 124 of pneumatic cylinder 126. Again, for ease of description the pneumatic lines to cylinder 126 and the internal workings thereof have been omitted. It should be understood that upon application of pneumatic pressure to cylinder 126 actuator rod 124 moves in an upward direction (as shown in FIG. 10) to produce a corresponding downward movement of plunger 120 into contact with lens 22 of the indicator positioned at the tensile pull station (station G) of rotating plate 56.

Plunger 120 therefore functions to apply a compressive force to lens 22 in order to reduce the magnitude of gap 116. This operation is performed with the indicator under load in the tensile pull position of station G as shown in FIG. 9.

Total movement of indicator area 40 with respect to window 22 from the no load to the design load condition of the fastener is, in the preferred embodiment, approximately 0.001 inches. Therefore, it will be appreciated that the degree of adjustment necessary at the gap 116 will, in most cases, be quite slight. Accordingly, the compression apparatus of FIG. 10 may be programmed to impart a predetermined downward indexing of lens 22 in recess 20 on the order of magnitude of approximately 0.0001 inches.

In a typical application of the compression apparatus of FIG. 10 an optical reading of sensor 118 (FIG. 1) indicating an excessive gap 116 can program an initial compressive force to be imparted to the lens 22 by means of the plunger 120 producing an inward movement of the lens a distance of 0.0001 inches. Thereafter a follow on reading of the optical sensor 118 can be made to determine whether additional indexing of the lens relative to the fastener is necessary. Additional incremental movement of 0.0001 inches may be imparted until the gap 116 is brought within predetermined limits as verified by the optical sensor 118.

In alternate embodiments the compression apparatus of FIG. 10 may be used to exert a continuous downward compression force causing a continuous downward movement of the lens 22 relative to the fastener until such time as the optical indicator 118 verifies that the gap is within predetermined limits. Thereafter plunger 120 may be removed from contact with the lens 22.

The apparatus described above provides for an adjustment of gap 116 in those instances where the gap is initially shown to be too large or of too great a depth. If, on the other hand, gap 116 is shown to be too shallow or of insufficient depth it is possible to raise or lift the lens 22 relative to the fastener in order to increase the depth of the gap. To accomplish this purpose any one of several techniques may be used. One technique provides for the introduction of a lifting tool into the interface 128 (FIG. 11) between the lens and the fastener head. Circumferentially spaced portions of the fastener head could be relieved in order to permit ready insertion of the lifting tool or tools whereby an upward force component could be exerted on the window in order to permit it to be lifted relative to the fastener head. A sufficient degree of lifting can take place until such time as the optical sensor 118 indicates that correct gap depth has been reached.

Alternate structures may be employed to permit adjustment of the gap 116. For example, screw threads may be defined on the window and at the recess 20 of the fastener. Rotation of the window relative to the fastener will then cause a gap adjustment to be made. To assist in the adjustment operation a slot could be defined in the upper surface of the window to receive a suitable turning tool such as a screw driver or the like.

Station G of applicant's assembly apparatus provides, therefore, for the sensing of both the no load and load conditions of the fastener. At the load condition of the fastener station G provides gap adjusting means in order to position the window relative to the indicator area of the indicator member within predetermined limits.

Once the indicator has been shown to have successfully passed the optical tests in both the no load and load conditions applicant then provides for a staking operation in order to firmly fix the capsule relative to the fastener head. In this staking operation circumferentially spaced portions of the fastener head are caused to be peened over and into the edge portion of lens 22 (at interface 128 of FIG. 11) in order to firmly lock the capsule relative to the fastener. For ease of description the staking operation and apparatus have not been shown in FIG. 1. Staking of the capsule relative to the fastener head may take place at station G or at a location between stations G and H. Alternately, staking may take place outside of the assembly machine of FIG. 1.

An an alternative to staking adhesive or other fastener means may be used to fix the capsule to the fastener head.

After optical sensing and staking, the accepted indicator is then indexed to station F where it is discharged from the rotating plate 56. As best seen in FIG. 7 station H consists of a discharge arm 130 having a contact portion 132 adapted to engage the indicator positioned within holding block 134. Discharge arm 130 is activated by a pneumatic cylinder 136 which is suitably attached to the machine base. Upon activation of cylinder 136 discharge arm 130 is caused to move in a clockwise motion causing contact portion 132 to strike the indicator causing it to be discharged from plate 56 into a suitable receptacle.

For ease of description the various operations of applicant's assembly machine have been described with reference to station A-H. Table 1 below summarizes briefly the function of each of the stations:

Table 1

| Station | Function |
|---------|----------|
| A | Window, reference ring, seal assembled as subassembly |
| B | Indicator member, sealing ball, fluid assembled as subassembly |
| C | Station A subassembly joined to Station B subassembly |
| D | Compression of Station C assembly |
| E | Capsule assembled to drilled bolt |
| F | Capsule pressed into bolt |
| G | Color sensed Tensile pull exerted on bolt Color sensed Gap adjustment made; capsule fixed to bolt |
| H | Discharge of completed indicator |

Applicant's invention in the preferred embodiment provides for the assembly and inspection of fluid type indicators of the type wherein an indicator area moves with respect to a window in order to visually indicate the load condition of a member. In addition to providing for assembly of the related parts, applicant's assembly apparatus provides for optical inspection of both the no load and load conditions of the strain member. Applicant's apparatus further provides for an adjustment of the capsule or fluid filled component with the strain member under load in order to provide for a predetermined visual presentation of the indicator when the fastener is under design load.

METHOD

The method of assembly of this invention comprises the steps of:

(a) providing a tensile element (12, FIG. 2) having a recess at one end thereof (20);

(b) providing a fluid filled capsule (capsule of FIG. 4) having a window (22) and an indicator area (40) movable with respect to the window;

(c) providing means (28, FIG. 4) to move the indicator area relative to the window as a function of the strain on the tensile element;

(d) inserting the fluid filled capsule at least partially into the recess of the tensile element with said indicator area closely adjacent the window;

(e) sensing the no load condition of the indicator;

(f) exerting a tensile pull (FIG. 9) on the tensile element so as to create a gap (116, FIG. 11) between the indicator area and the window;

(g) measuring said gap with the tensile element under load (optical sensor 118, FIG. 1);

(h) adjusting the gap to a predetermined value with said tensile element under load (FIG. 10);

(i) releasing the tensile pull on the tensile element;

(j) fixing the capsule relative to the tensile element.

The tensile pull exerted by the method of the preferred embodiment of this invention has a magnitude approximately equal to the design load of the tensile element.

Once again it should be emphasized that the assembly apparatus and method of this invention are applicable to indicators generally and should not be considered as directed to the specific embodiment of fluid filled indicator shown in FIG. 2 of this specification. The indicator embodiment of FIG. 2 has been illustrated merely for purposes of describing applicant's assembly apparatus and method and should not be considered as limiting applicant's apparatus and method.

Applicant's apparatus and method are equally applicable to the assembly of non-fluid or mechanical indicators such as the types shown in U.S. Pat. No. 3,908,508 and U.S. application Ser. No. 669,247 owned by Modulus Corporation, the assignee of this application. Applicant's apparatus and method provide generally for the optical measurment of a gap or distance between two members such as a movable member and a fixed member or two movable members with the indicator in both a no-load and a load condition.

Applicant's apparatus and method are also applicable to the assembly and testing of compression type indicators of the type in which the application of a compressive force to a member causes a change in length of the member.

What is claimed is:

1. A method of assembly of a strain indicator comprising the steps of:
   (a) providing a tensile element;
   (b) providing an indicator, said indicator having means to produce a visual effect which is a function of the strain on said tensile element;
   (c) inserting said indicator at least partially into said tensile element;
   (d) exerting a tensile pull on said tensile element so as to create a visual effect at said indicator;
   (e) optically measuring said visual effect with said tensile member under load;
   (f) comparing the results of optical measurement with a standard; whereby,
   the quality of the strain indicator is verified under load.

2. A method of assembly of a strain indicator comprising the steps of:
   (a) providing a tensile element;
   (b) providing an indicator, said indicator having at least one element which is movable as a function of the strain on said tensile element, the movement of said element producing a visual effect;
   (c) operatively interconnecting said indicator to said tensile element;
   (d) exerting a tensile pull on said tensile element so as to create movement of said element of said indicator;
   (e) optically measuring the degree of movement of said element of said indicator;
   (f) comparing the results of optical measurement with a standard; whereby,
   the quality of the strain indicator is verified under load.

3. The method of claim 2 in which the degree of movement of said element of said indicator is measured relative to a fixed element.

4. The method of claim 3 in which there is provided after the comparing step (f) the additional step (g) of adjusting the degree of movement as optically measured under load to a standard.

5. A method of assembly of a strain indicator comprising the steps of:
   (a) providing a tensile element having a recess at one end thereof;

(b) providing an indicator having a fixed reference and an indicator area movable with respect to said reference;
(c) providing means to move said indicator area relative to said reference as a function of the strain on said tensile element;
(d) inserting said indicator at least partially into said recess of said tensile element with said indicator area closely adjacent said reference;
(e) exerting a tensile pull on said tensile element so as to create a gap between said indicator area and said reference;
(f) measuring said gap with said tensile element under load;
(g) adjusting said gap to a predetermined value;
(h) releasing the tensile pull on said tensile element.

6. The method of claim 5 in which the tensile pull exerted on said tensile element has a magnitude approximately equal to the design load of said tensile element.

7. The method of claim 5 in which said measuring step (f) is performed by means of optical sensing means which senses a color change in said indicator area.

8. The method of claim 5 in which said adjusting step (g) is performed by moving said reference relative to said indicator area.

9. A method of assembly of a strain indicator comprising the steps of:
(a) providing a tensile element having a recess and an internal abutment means;
(b) providing a fluid filled capsule having a window and an indicator area movable with respect to said window with said capsule fixed to said tensile element, there being provided means at said capsule to bias said indicator area away from said window with said tensile element in a condition of strain, said internal abutment means of said tensile element coacting with said capsule to move said indicator area into close proximity to said window with said tensile element in a relaxed condition;
(c) inserting said capsule at least partially into said recess of said tensile element such that said capsule is in contact with said internal abutment means;
(d) exerting a compressive force on said capsule so as to bring said indicator area in close proximity to said window with said tensile element in a relaxed condition;
(e) exerting a tensile pull on said tensile element so as to create a gap between said window and said indicator area;
(f) measuring said gap with said tensile element under load;
(g) adjusting said gap to a predetermined value with said tensile element under load by means of a movement of said window relative to said indicator area;
(h) fixing said capsule relative to said tensile element; and
(i) releasing said tensile pull on said tensile element so as to cause said indicator area to return to a position of close proximity to said window.

* * * * *